March 14, 1950 R. H. FREDERICK 2,500,812
PUMP
Filed Oct. 25, 1946 2 Sheets-Sheet 2
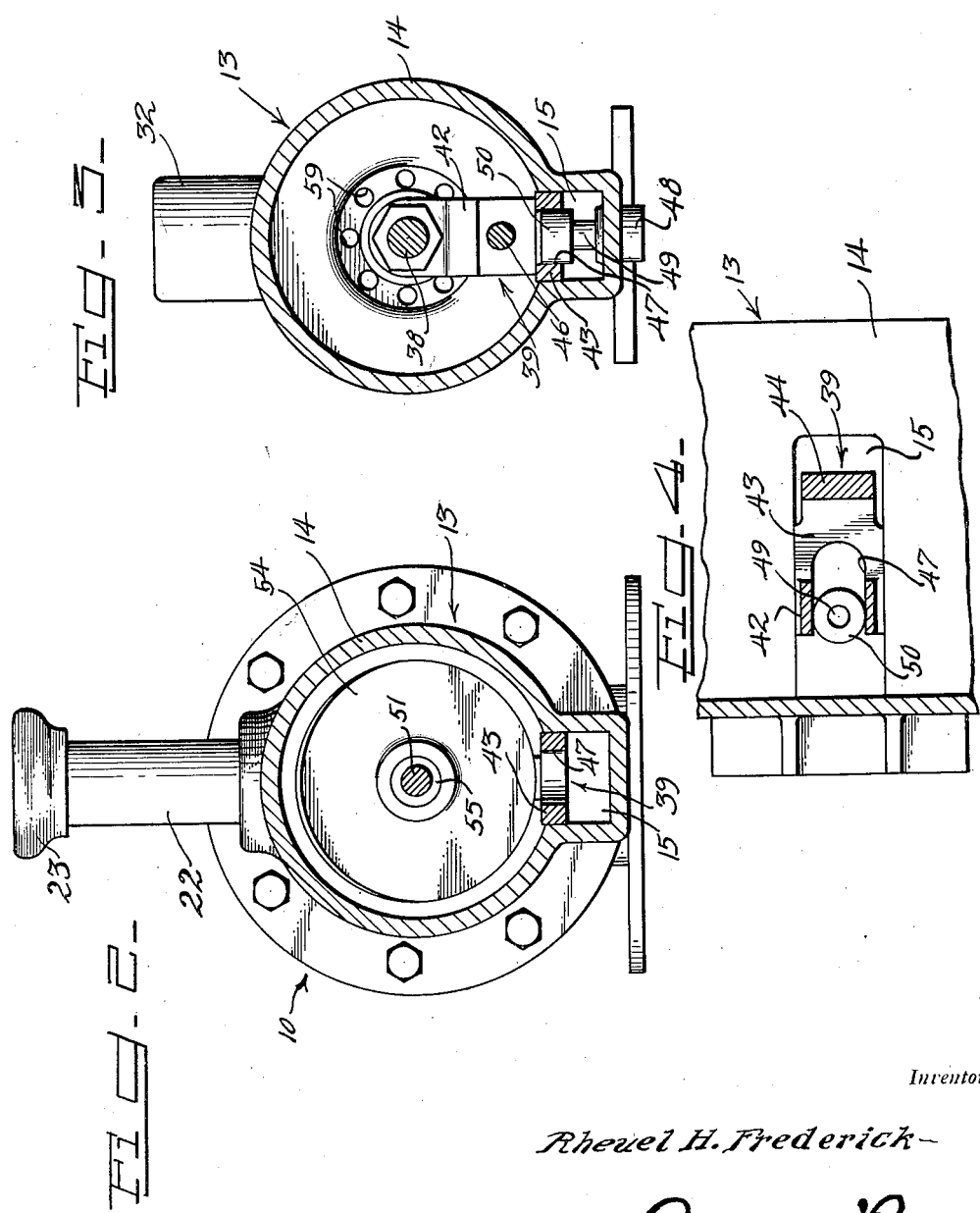
Inventor
Rheuel H. Frederick
By Clarence A. O'Brien
and Harvey B. Jacobson
Attorneys Patented Mar. 14, 1950

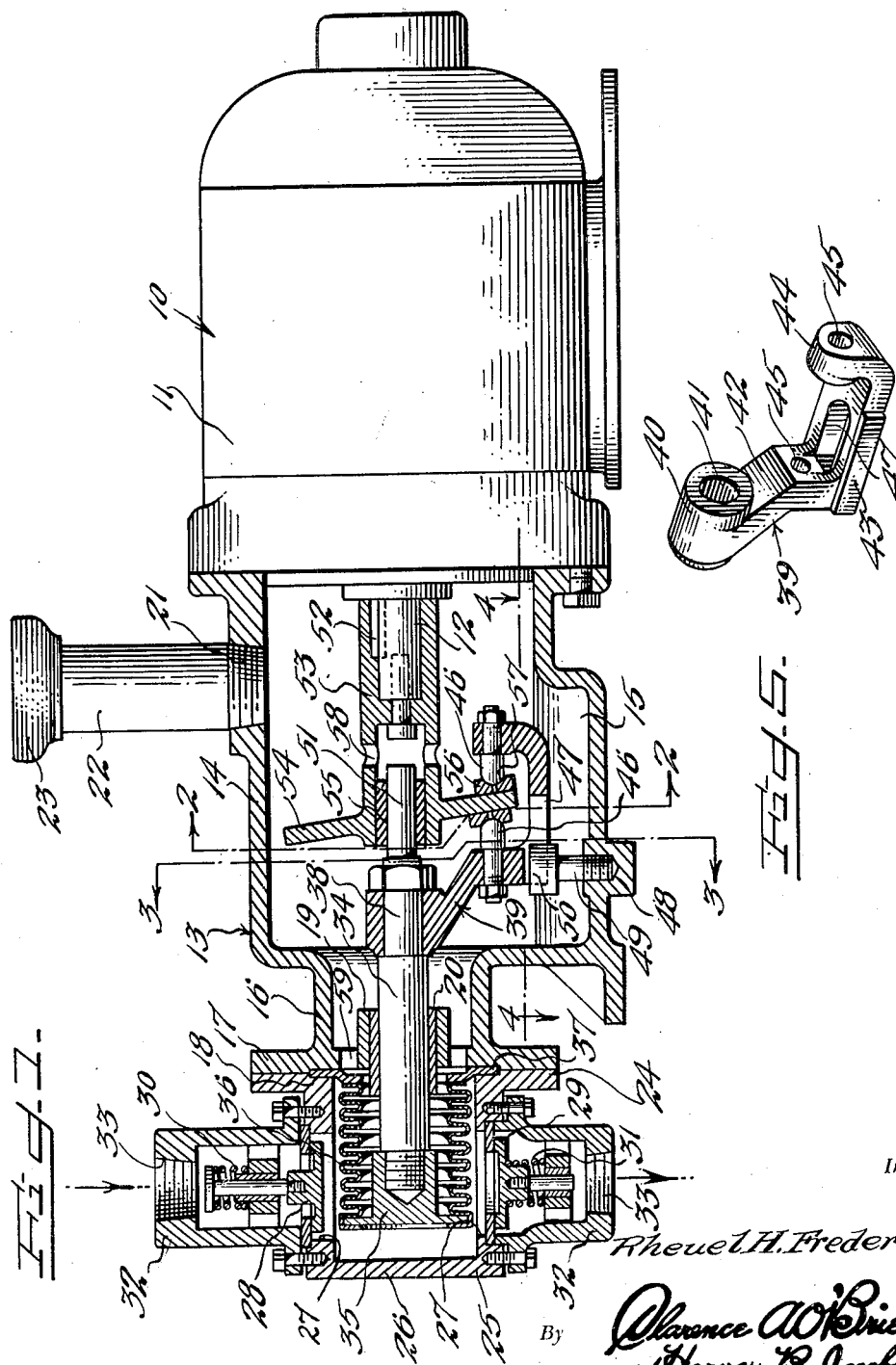

2,500,812

UNITED STATES PATENT OFFICE 2,500,812

PUMP

Rheuel H. Frederick, High Bridge, N. J.

Application October 25, 1946, Serial No. 705,582

5 Claims. (Cl. 103—152)

1

This invention relates to a pump and has for its primary object to compress or exhaust fluid according to the use desired.

Another object is rapidly to displace fluid by drawing it into and expelling it from the cylinder.

A further object is to avoid the necessity of using expensive packing and the like about a piston rod and a piston operable in a cylinder for pumping fluid.

A still further object is to simplify the drive of a reciprocating plunger such as would be employed for operating a piston within a cylinder.

Other features include an arm extending laterally from the plunger rod shoes carried by the arm and riding against opposite faces of the cam disk to cause the plunger rod to reciprocate as the disk rotates and a guide for holding the arm against turning movement about the axis of the plunger rod.

In the drawings:

Figure 1 is a side view partially in section of a pump embodying the features of this invention.

Figure 2 is a transverse sectional view taken substantially along the line 2—2 of Figure 1.

Figure 3 is a transverse sectional view taken substantially along the line 3—3 of Figure 1, and Figure 4 is a longitudinal sectional view taken substantially along the line 4—4 of Figure 1.

Figure 5 is a perspective view of the actuating arm of the plunger rod.

Referring to the drawings in detail, a prime mover designated generally by reference numeral 10 is encased within a housing 11 and carries a drive shaft 12. The prime mover may be an electric motor, internal combustion engine or any other suitable mechanism capable of transmitting rotary motion to the drive shaft 12.

Bolted or otherwise attached to the end of the housing 11 through which the drive shaft 12 projects is a suitable casing designated generally 13 which comprises a substantially cylindrical member 14 provided at its underside with a trough 15 forming a guide way. Extending from the end of the cylindrical body 14 opposite that which is attached to the housing 11 is a tubular extension 16 terminating in an attaching flange 17 forming its outer face with an annular recess 18 therein. Formed axially of the end wall of the tubular extension 16 is an inwardly extending tubular boss 19 in which a bushing 20 is fitted. A radial breather opening 21 is formed in the tubular body 14 and threaded there into is a breather pipe 22 the upper end of

2 which is preferably fitted with a suitable filter 23 so that air entering the interior of the tubular body 14 will be cleaned.

Attached to the flange 17 in any suitable manner is the attaching flange 24 of a cylinder 25, the outer end of which is closed by end wall 26, the opposite end of the cylinder 25 being in alignment with the tubular extension 16. Formed at diametrically opposite points on the cylinder 25 are ports 27 which are closed by inlet and outlet valves 28 and 29, which are normally urged into closed position under the influence of compression springs 30 and 31 respectively. The valve 28 opens inwardly into the cylinder 25 so that as the fluid displacing element to be more fully hereinafter described moves to increase the volume of the cylinder the valve 28 will open to admit fluid to the cylinder. The valve 29 on the other hand is adapted to open outwardly so that when the fluid displacing element moves to reduce the capacity of the cylinder the valve 29 will be forced open and the fluid admitted through the valve 28 will be expelled through the port 27. Suitable cages 32 enclose the valves 28 and 29 and are tapped as at 33 for connection with any suitable fluid system.

Mounted to reciprocate through the bushing 20 is a plunger rod 34 which as illustrated extends into the cylinder 25 and carries at its outer end a head 35 to which is attached one end of a bellows 36, the opposite end of which is provided with an out-turned flange 37 to be clamped in the recess 18 between the flanges 17 and 24 to form a fluid tight junction and effectively close the open end of the cylinder 25. It is to be understood of course that the end of the bellows which is attached to the head 35 is also rendered fluid tight so that as the rod 34 reciprocates fluid entering the cylinder will be expelled through the valve 29. Formed at the end of the rod 34 opposite the head 35 is a cylindrical extension 38 forming a support for a laterally extending arm designated generally 39. This arm comprises a socket 40 provided with an opening 41 in which the cylindrical extension 38 is received and depending from said socket is an angularly extending arm 42 carrying at its lower end an extension 43 which when the device is assembled enter the trough 15 as will be readily understood upon reference to Figures 2, 3, and 4. An upwardly extending arm 44 is formed on the end of the extension 43 opposite that joining the arm 42 and the arms 42 and 44 are formed respectively with aligning openings 45 in which round headed pins 46 are fitted. Formed longitudinally in the extension 43 is an elongated slot 47 which as illustrated extends through the lower end of the arms 42. Supported in an internally screw threaded boss 48 carried by the bottom wall of the trough 15 is a stud 49 upon which a roller 50 is mounted. This roller is received in the slot 47 and serves as a guide to hold the arm 39 and rod 34 against rotary movement. Extending longitudinally from the ends of the extension 38 on the rod 34 is a pilot shaft 51, the purpose of which will be more fully hereinafter described.

Keyed or otherwise attached as at 52 to the drive shaft 12 of the prime mover 10 is a sleeve 53 which extends axially beyond the end of the shaft 12 and carries an angularly disposed cam disk 54, the periphery of which rides between the studs 46 as will be readily understood upon reference to Figure 1. A bushing 55 is fitted in the end of the sleeve 53 opposite that receiving the drive shaft 12 and received in the bore of the bushing 55 is the pilot 51. It will thus be seen that the shaft 12, plunger rod 34 and sleeve 53 are in longitudinal alignment along a common axis. Riding on opposite faces of the disk 54 and bearing against the rounded end of the stud 46 are shoes 56 having spherical recesses 57 in which the spherical heads of the studs 46 are received.

Formed in the sleeve 53 between the end of the pilot 51 and the end of the drive shaft 12 is an annular row of spaced radial vents 58, and a row of vents 59 extends annularly through the end wall of the tubular extension 16 so that air trapped within the bellows 36 may be expelled into the interior of the housing 14 and discharged through the breather pipe 22.

In operation it will be understood that when the prime mover 10 is set into operation the shaft 12 will rotate, thus rotating the disk 54 so that the shoes 56 will be moved along an axis parallel with the longitudinal axis of the drive shaft 12. Such movement of the shoes 56 will cause the studs 46 to reciprocate the arm 39 and move the plunger rod 34 back and forth, thus expanding and contracting the bellows 36 so as to alternately increase and decrease the capacity of the cylinder 25. Obviously as the bellows contracts the valve 28 will be disengaged from its seat so as to admit fluid into the cylinder 25, and when the bellows is expanded the fluid so admitted will be discharged through the port 27 by forcing the valve 29 to open against its spring 31. By reason of the direct connection of the plunger rod 34 with the drive shaft 12 it will be obvious that fluid may be pumped through the cylinder 25 with great rapidity, as the bellows will be expanded and contracted with each revolution of the drive shaft 12. Obviously the pump may be employed not only to compress fluids, but also it may be used to exhaust fluids from a container and it may be employed as a vacuum pump. By employing the bellows 36 and the head 35 as the fluid displacing means it is obvious that piston rings and packing around the plunger rod 34 may be eliminated, and an unusually tight pump is thus produced.

While in the foregoing there has been shown and described the preferred embodiment of this invention it is to be understood that minor changes in the details of construction, combination and arrangement of parts may be resorted to without departing from the spirit and scope of the invention as claimed.

What I claim:

1. In a pump including a cylinder, an inlet and an outlet valve for said cylinder, fluid displacing means in said cylinder, a plunger rod in said cylinder to reciprocate axially through one end thereof, and a prime mover including a drive shaft, a sleeve coupled to the drive shaft and in axial alignment with the plunger rod, a cam disk on the sleeve, a laterally extending arm secured on said plunger rod, means on said arm engaging said cam so that on rotation of said cam disk the rod reciprocates, and means to prevent rotation of said arm and rod.

2. The combination of claim 1 wherein said arm includes a pair of oppositely disposed apertures, and said means on said arm include pins extending through said apertures.

3. The combination of claim 2 wherein shoes having hemispherical recesses therein are secured to said cam disk, said pins being seated in said recesses.

4. The combination of claim 1 wherein said arm includes an elongated slot and a roller mounted in said pump and received in said slot to prevent rotation of said arm and rod.

5. The combination of claim 1 wherein said plunger rod includes a pilot extending into said sleeve.

RHEUEL H. FREDERICK.

REFERENCES CITED

The following references are of record in the file of this patent:

UNITED STATES PATENTS

| Number | Name | Date |
| --- | --- | --- |
| 1,409,057 | Mitchell | Mar. 7, 1922 |
| 1,599,899 | Kettering et al. | Sept. 14, 1926 |
| 1,708,306 | Giesler | Apr. 9, 1929 |
| 2,178,972 | Sherman | Nov. 7, 1939 |

FOREIGN PATENTS

| Number | Country | Date |
| --- | --- | --- |
| 21,323 | Sweden | Jan. 12, 1904 |